(12) United States Patent
Kishanlal Joshi et al.

(10) Patent No.: US 12,164,394 B2
(45) Date of Patent: Dec. 10, 2024

(54) DATABASE REVERSION WITH BACKUP DATA STRUCTURES

(71) Applicant: Microsoft Technology Licensing, LLC, Redmond, WA (US)

(72) Inventors: Varun Joshi Kishanlal Joshi, Bellevue, WA (US); Anil Kumar Ruia, Sammamish, WA (US); Yogesh Bansal, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 28 days.

(21) Appl. No.: 18/073,805

(22) Filed: Dec. 2, 2022

(65) Prior Publication Data

US 2024/0184674 A1 Jun. 6, 2024

(51) Int. Cl.
  *G06F 11/14* (2006.01)
  *G06F 11/18* (2006.01)

(52) U.S. Cl.
  CPC ...... *G06F 11/1471* (2013.01); *G06F 11/1469* (2013.01); *G06F 11/181* (2013.01); *G06F 2201/80* (2013.01)

(58) Field of Classification Search
  CPC ............. G06F 11/1471; G06F 11/1469; G06F 11/181; G06F 2201/80
  USPC .......................................................... 714/15
  See application file for complete search history.

(56) References Cited

U.S. PATENT DOCUMENTS

| | | | |
|---|---|---|---|
| 8,204,859 B2 | 6/2012 | Ngo | |
| 9,804,935 B1 | 10/2017 | Holenstein et al. | |
| 10,002,050 B1 | 6/2018 | Zhang | |
| 10,635,546 B2 | 4/2020 | Karthikeyan et al. | |
| 10,824,510 B1 | 11/2020 | Doshi et al. | |
| 2004/0220961 A1* | 11/2004 | Lee | G06F 11/1471 707/999.102 |
| 2008/0228834 A1* | 9/2008 | Burchall | G06F 11/2038 |
| 2017/0300387 A1 | 10/2017 | Durairaj | |
| 2021/0263810 A1 | 8/2021 | Bharadwaj et al. | |

FOREIGN PATENT DOCUMENTS

CN 114296827 A 4/2022

OTHER PUBLICATIONS

Hendrickson, et al., "Changes to High Availability and Site Resilience Over Previous Versions of Exchange Server", Retrieved from: https://docs.microsoft.com/en-us/exchange/high-availability/ha-changes?view=exchserver-2019, Mar. 19, 2022, 16 Pages.

* cited by examiner

Primary Examiner — Yair Leibovich

(57) ABSTRACT

A system for database reversion is described. The system comprises: a database engine configured to host an active database; a log engine configured to generate transaction logs for transactions affecting the active database; a backup engine configured to create a backup data structure to allow for database reversion; and a memory buffer separate from the active database. A page in the active database has an associated page timestamp indicating a most recent update of the page in the active database. The database engine is configured to flush an updated copy of a page in the memory buffer to the active database. The backup engine is configured to, prior to the flush, store an image of the page in the active database to the backup data structure when the page in the active database is older than the time value related to the creation time of the backup data structure.

20 Claims, 8 Drawing Sheets

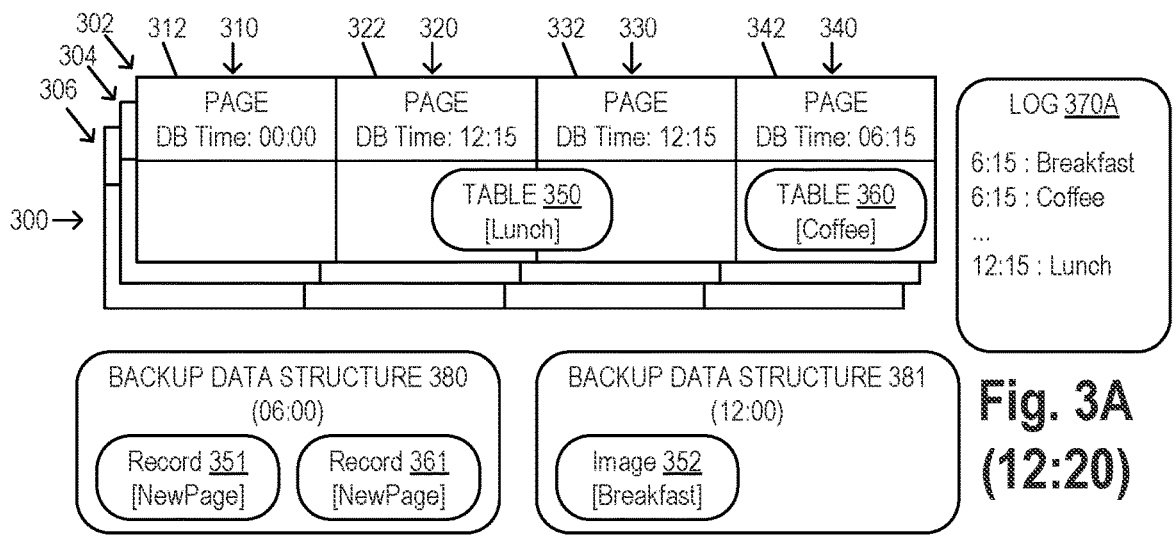
Fig. 3A (12:20)
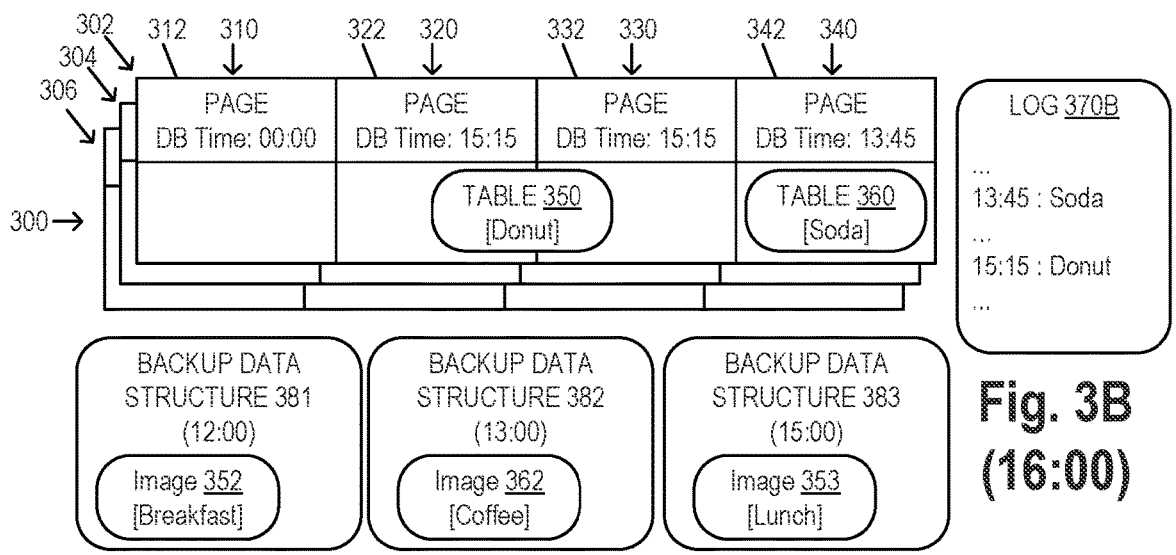
Fig. 3B (16:00)
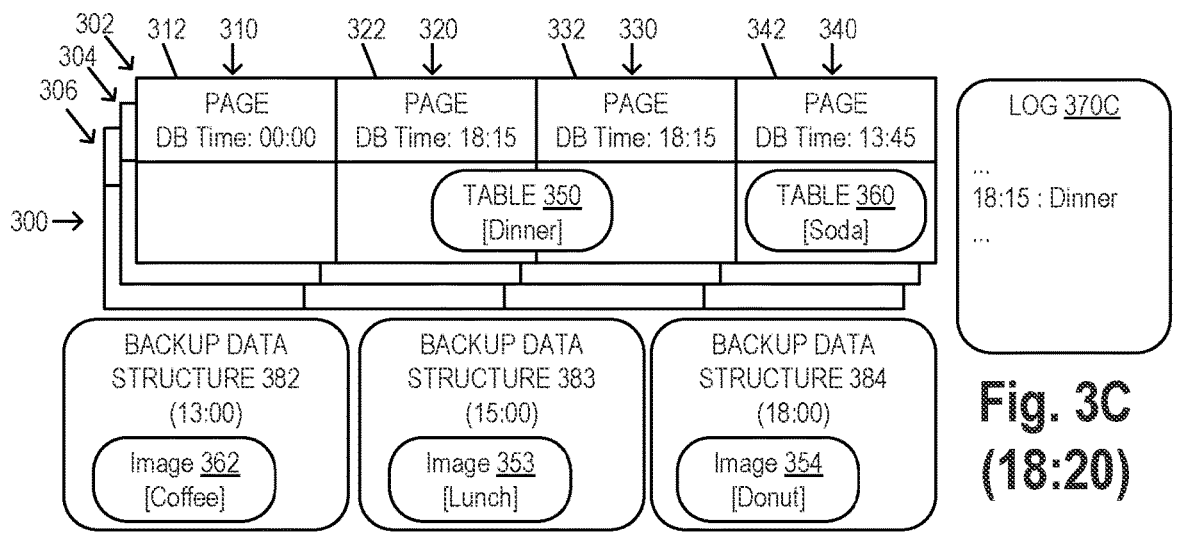
Fig. 3C (18:20)

DATABASE REVERSION WITH BACKUP DATA STRUCTURES

BACKGROUND

Storage processing systems may be configured to provide high availability to data for users, for example, by using distributed storage techniques and/or data redundancy techniques. High availability is often desirable for databases, email mailboxes, shared file storage, and other suitable data storage scenarios. In some scenarios, a database is maintained as multiple separate copies that may be stored in different locations for geographic separation, reducing the likelihood that a disk failure, server failure, power failure, or other issue would prevent access to the database. To allow for data recovery in other scenarios, such as an accidental deletion of a database entry or data corruption, a storage processing system may be configured to keep one copy of the database as a lag copy, where the lag copy represents a copy of the database that lags behind a current copy by a desired time interval, such as six hours, six days, etc. With the lag copy, changes to the database that are committed may still be rolled back by activating the lag copy and, if possible, applying subsequent changes to the lag copy using a log file of transactions for the database. However, maintaining the lag copy may be resource intensive, for example, using additional storage space and disk input/output operation.

It is with respect to these and other general considerations that embodiments have been described. Also, although relatively specific problems have been discussed, it should be understood that the embodiments should not be limited to solving the specific problems identified in the background.

SUMMARY

Aspects of the present disclosure are directed to improving storage performance of a storage processing system.

In one aspect, a system for database reversion is provided. The system comprises a database engine configured to host an active database and a passive database and to replicate the active database to the passive database. The active database comprises a plurality of pages, wherein a page in the active database has an associated page timestamp indicating a most recent update of the page in the active database. The system further comprises a log engine configured to generate transaction logs for transactions affecting the active database and a backup engine configured to create a backup data structure to allow for database reversion for the active database, the backup data structure being separate from the active database and the passive database and having a time value related to a creation time of the backup data structure. The system further comprises a memory buffer separate from the active database. The database engine is configured to: copy the page in the active database to the memory buffer, update the copy of the page in the memory buffer, and flush the updated copy of the page in the memory buffer to the active database, wherein the flush causes the updated copy of the page in the memory buffer to replace the page in the active database. The backup engine is configured to, prior to the flush of the updated copy of the page in the memory buffer to the active database, store an image of the page in the active database to the backup data structure when the page in the active database, prior to the flush, is older than the time value related to the creation time of the backup data structure. The backup engine is further configured to receive a request to revert the passive database to a requested time, identify the backup data structure based on the requested time and the time value associated with the backup data structure, and revert the passive database to the requested time using the identified backup data structure to copy the image of the page to the passive database.

In another aspect, a method for database reversion is provided. The method comprises: hosting an active database and a passive database, wherein the active database comprises a plurality of pages, wherein a page in the active database has an associated page timestamp indicating a most recent update of the page in the active database; replicating the active database to the passive database; creating a backup data structure to allow for database reversion for the active database, the backup data structure being separate from the active database and the passive database and having a time value related to a creation time of the backup data structure; copying the page in the active database to a memory buffer separate from the active database; updating the copy of the page in the memory buffer; flushing the updated copy of the page in the memory buffer to the active database, wherein the flushing causes the updated copy of the page in the memory buffer to replace the page in the active database; prior to the flushing of the updated copy of the page in the memory buffer to the active database, storing an image of the page in the active database to the backup data structure when the page in the active database, prior to the flush, is older than the time value related to the creation time of the backup data structure, receiving a request to revert the passive database to a requested time; identifying the backup data structure based on the requested time and the time value associated with the backup data structure; and reverting the passive database to the requested time using the identified backup data structure to copy the image of the page to the passive database.

In yet another aspect, a non-transient computer-readable storage medium is provided. The storage medium comprises instructions being executable by one or more processors to cause the one or more processors to: host an active database and a passive database, wherein the active database comprises a plurality of pages, wherein a page in the active database has an associated page timestamp indicating a most recent update of the page in the active database; replicate the active database to the passive database; create a backup data structure to allow for database reversion for the active database, the backup data structure being separate from the active database and the passive database and having a time value related to a creation time of the backup data structure; copy the page in the active database to a memory buffer separate from the active database; update the copy of the page in the memory buffer; flush the updated copy of the page in the memory buffer to the active database, wherein the flushing causes the updated copy of the page in the memory buffer to replace the page in the active database; prior to the flushing of the updated copy of the page in the memory buffer to the active database, store an image of the page in the active database to the backup data structure when the page in the active database, prior to the flush, is older than the time value related to the creation time of the backup data structure, receive a request to revert the passive database to a requested time; identify the backup data structure based on the requested time and the time value associated with the backup data structure; and revert the passive database to the requested time using the identified backup data structure to copy the image of the page to the passive database.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS/FIGURES

Non-limiting and non-exhaustive examples are described with reference to the following Figures.

Figure 1:
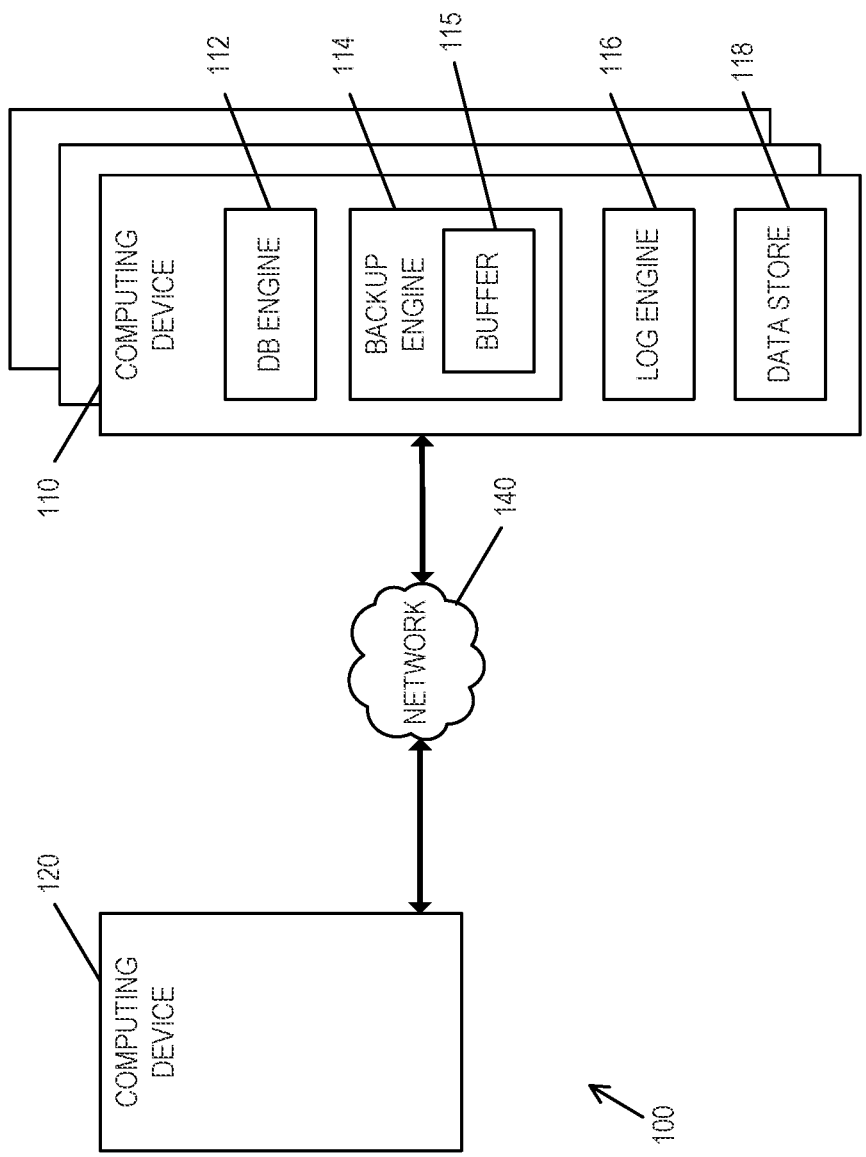
FIG. 1 shows a block diagram of an example of a storage processing system, according to an example embodiment.

FIGS. 3A, 3B, and 3C show diagrams of an example data timeline for storage using the system of FIG. 1, according to an example embodiment.

Figure 4:
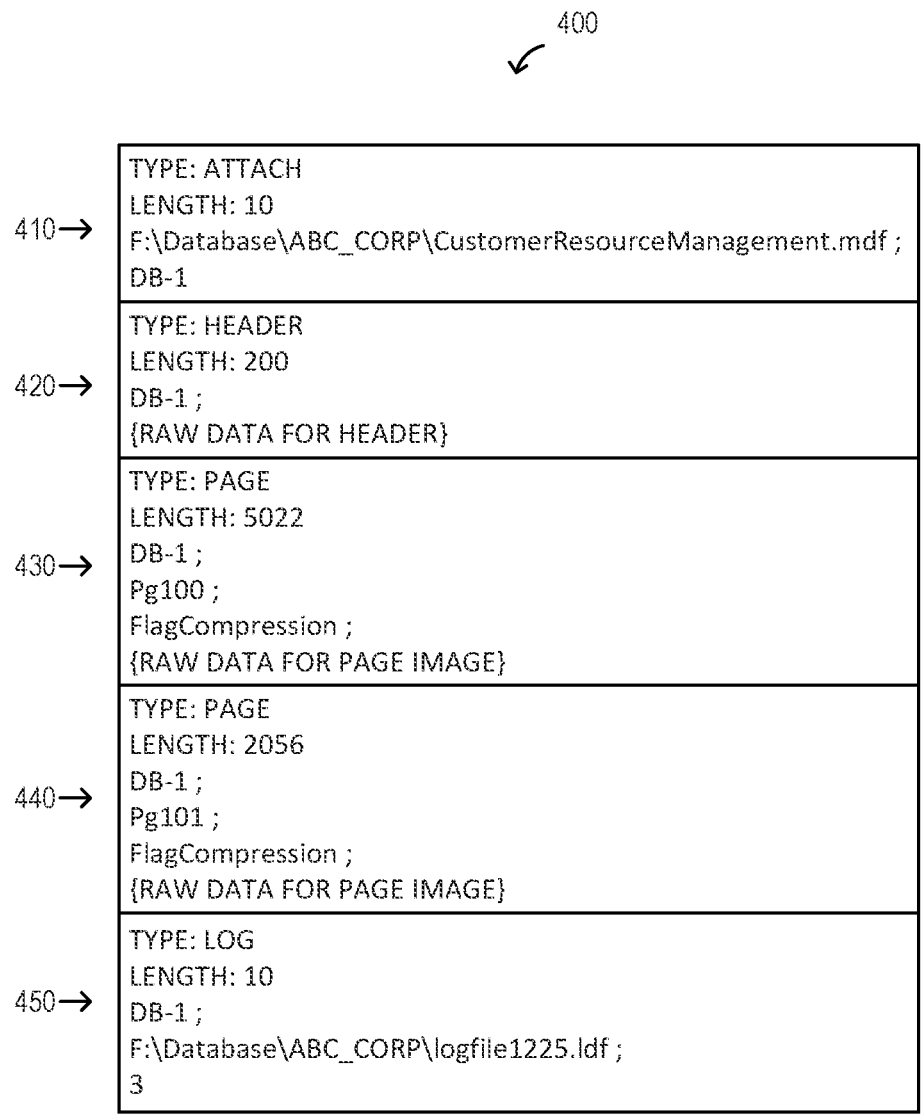

FIG. 4 shows an example diagram of a backup data structure, according to an example embodiment.

Figure 5:
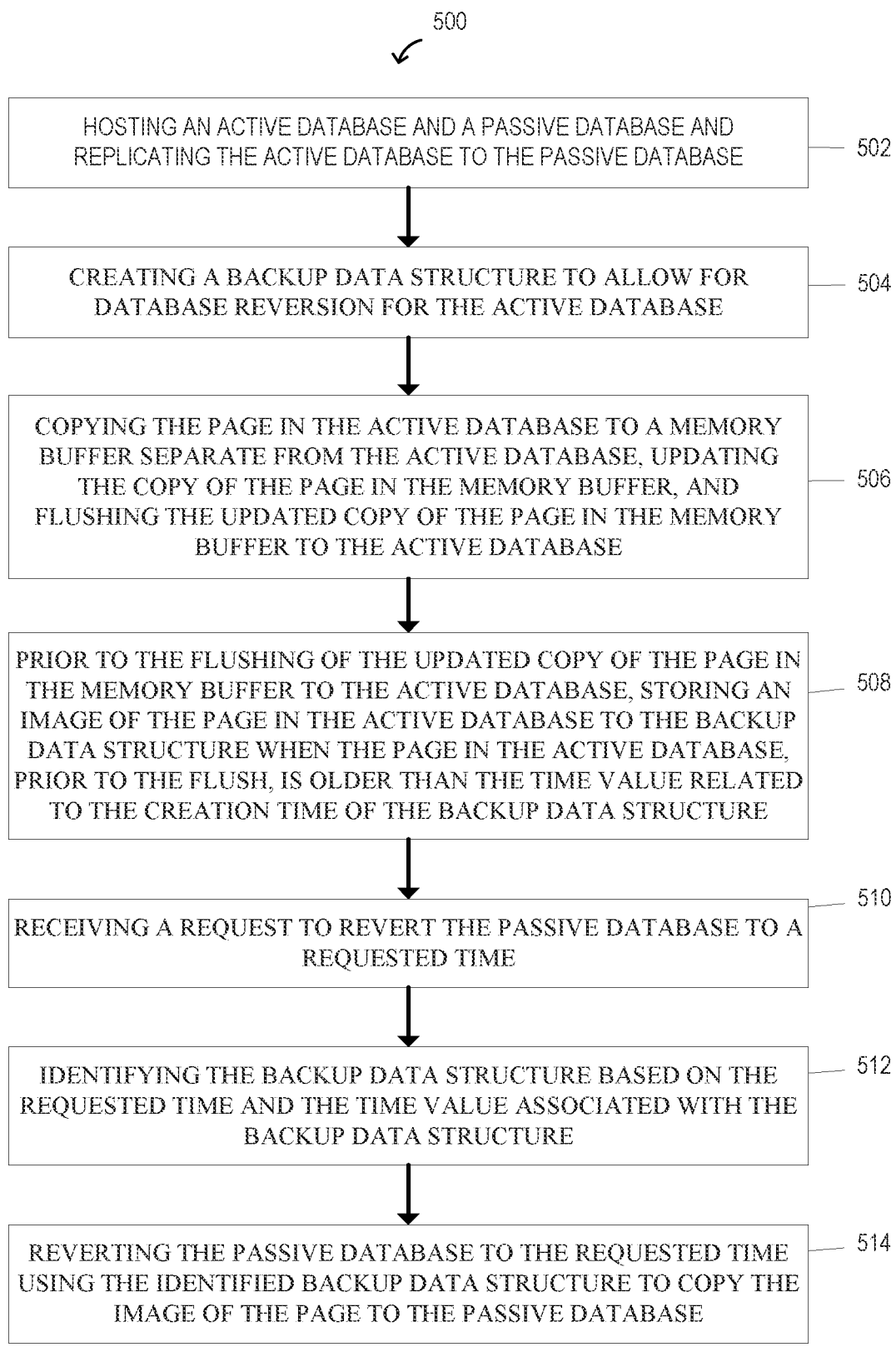

FIG. 5 shows a flowchart of an example method for reverting a database, according to an example embodiment.

Figure 6:
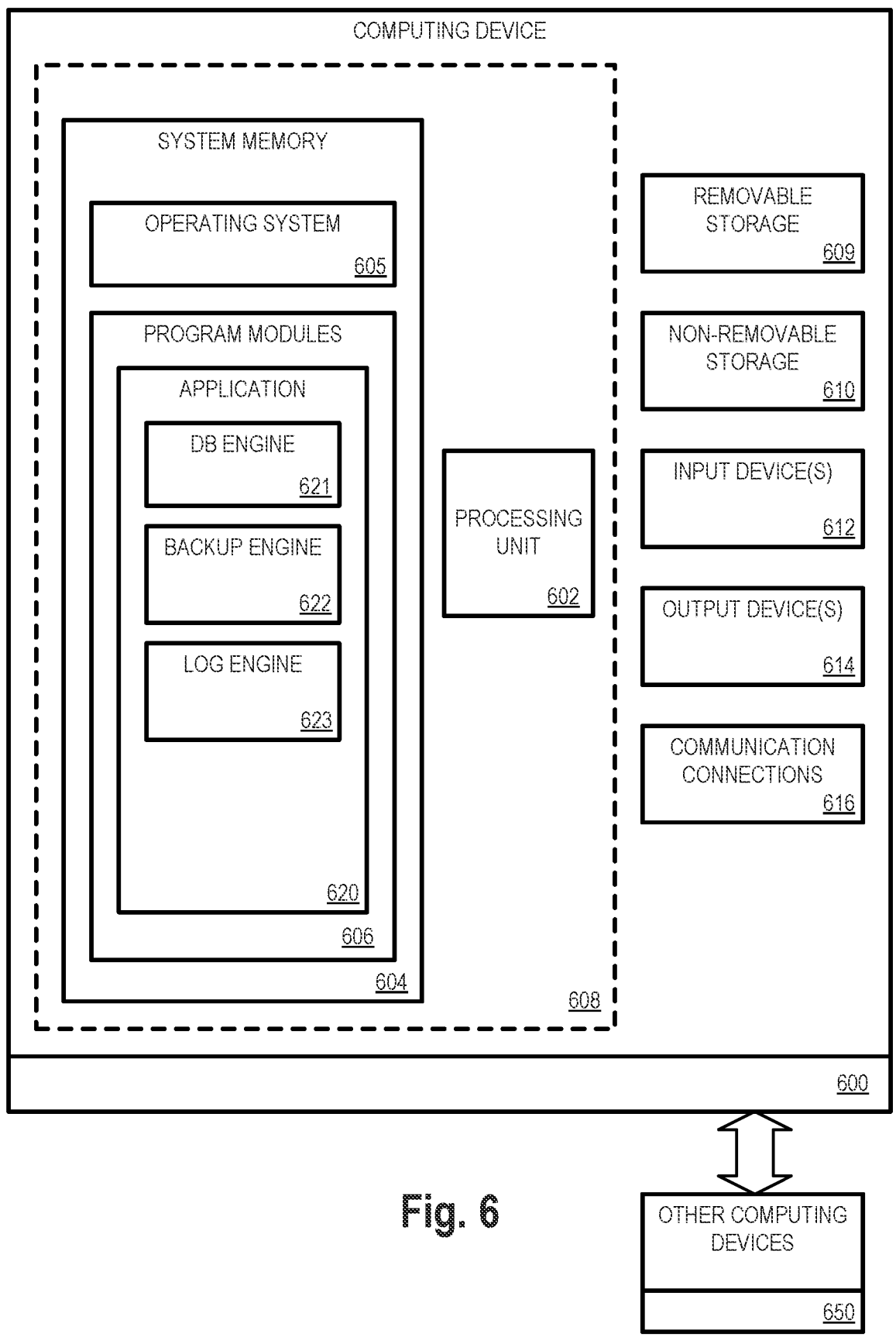

FIG. 6 is a block diagram illustrating example physical components of a computing device with which aspects of the disclosure may be practiced.

Figure 7:
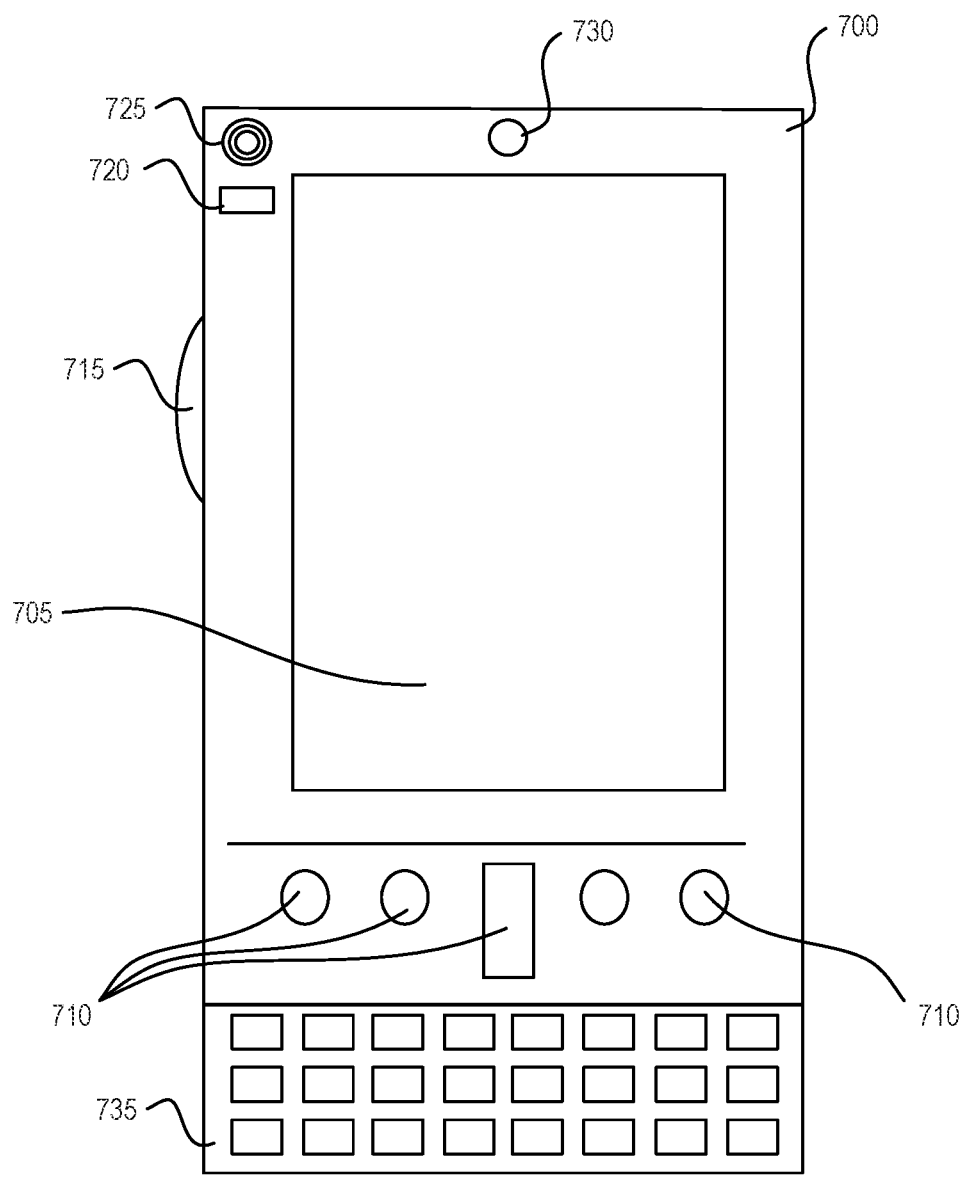
Figure 8:
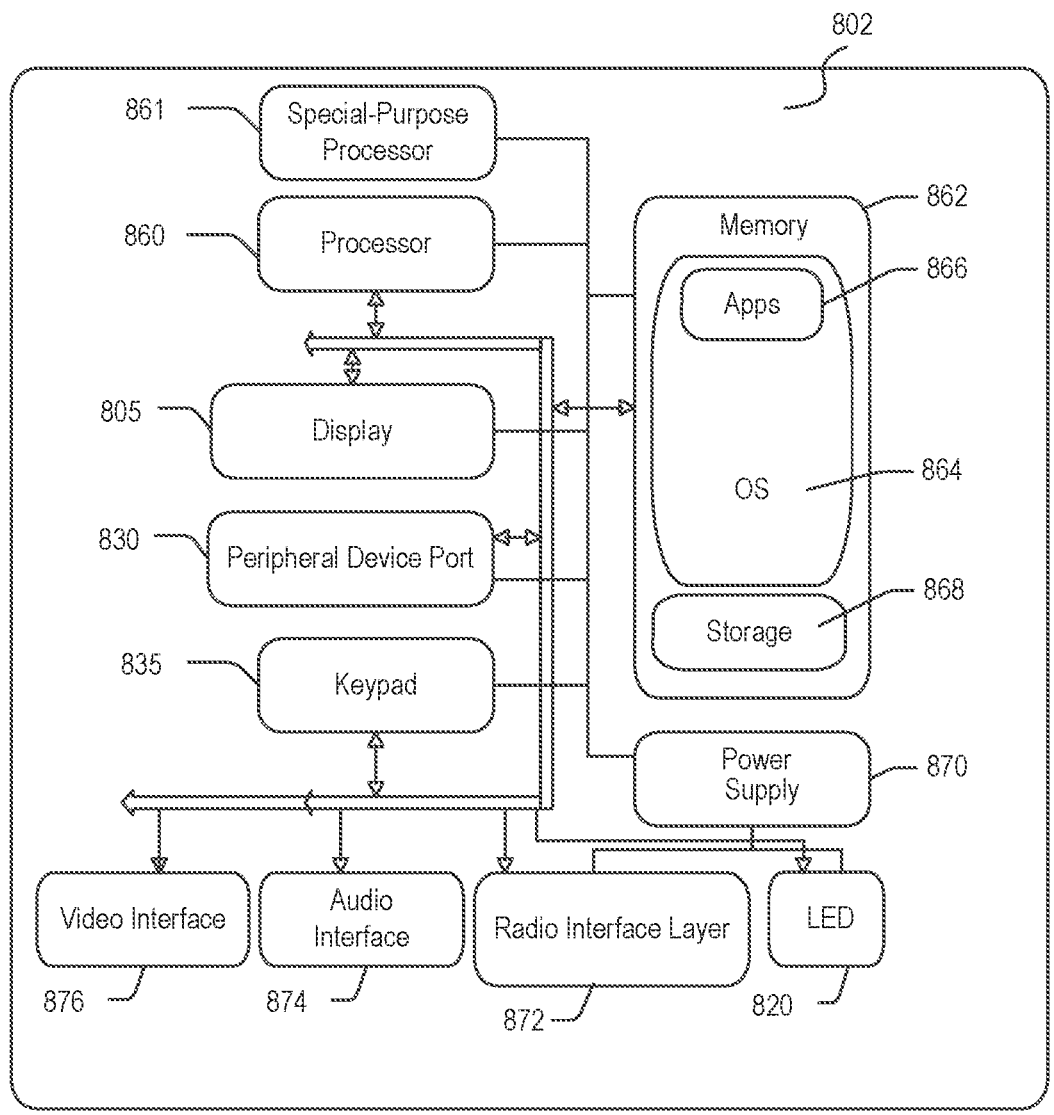

FIGS. 7 and 8 are simplified block diagrams of a mobile computing device with which aspects of the present disclosure may be practiced.

DETAILED DESCRIPTION

In the following detailed description, references are made to the accompanying drawings that form a part hereof, and in which are shown by way of illustrations specific embodiments or examples. These aspects may be combined, other aspects may be utilized, and structural changes may be made without departing from the present disclosure. Embodiments may be practiced as methods, systems, or devices. Accordingly, embodiments may take the form of a hardware implementation, an entirely software implementation, or an implementation combining software and hardware aspects. The following detailed description is therefore not to be taken in a limiting sense, and the scope of the present disclosure is defined by the appended claims and their equivalents.

The present disclosure describes various examples of storage processing systems that provide for reverting a database to an earlier state with improved availability and performance (e.g., reduced disk space or reduced disk input/output). Data may be hosted in a system on an active database and one or more passive databases of the system, or multiple active databases of the system, using replication. To provide a capability for reverting the system to the earlier state, the system is configured to store backup data structures, (e.g., copies or "snapshots") of data changes where the backup data structures allow for reverting the passive database to the earlier state. The earlier state may be earlier by several hours, days, one week, or another suitable interval. The backup data structures of data changes are stored separately from the passive database itself, which allows for concurrent access to the passive database. In other words, the passive database may generally be treated as an active database (or passive database that may be transitioned to active if desired) for improved access to data stored within the database.

Snapshots or backup data structures may be captured at predetermined intervals, on triggers or occurrence of events, any time a page is about to be updated, or other suitable criteria. To reduce disk capacity needed for storing the snapshots, a backup engine stores images of pages that have been updated in a memory buffer prior to flushing of the updated page from the memory buffer to the active database when the page in the active database, prior to the flush, is older than a time value related to a creation time of the backup data structure. In this way, updated pages from the memory buffer are omitted from the backup data structure when the pages have been updated more recently than the creation time of the corresponding backup data structure, which avoids redundant copies of a same page.

This and many further embodiments for a computing device are described herein. For instance, FIG. 1 shows a block diagram of an example of a storage processing system 100, according to an example embodiment. The system 100 includes one or more computing devices 110 and computing devices 120. A network 150 communicatively couples the computing device 110 and computing device 120. The network 150 may comprise one or more networks such as local area networks (LANs), wide area networks (WANs), enterprise networks, the Internet, etc., and may include one or more of wired, wireless, and/or optical portions.

Computing device 110 may be any type of computing device, including a network server, distributed computing system, cluster, cloud server, or other suitable computing device. Computing device 110 may also be a mobile computer or mobile computing device (e.g., a Microsoft® Surface® device, a laptop computer, a notebook computer, a tablet computer such as an Apple iPad™, a netbook, etc.), or a stationary computing device such as a desktop computer or PC (personal computer). Computing device 110 may be configured to execute one or more software applications (or "applications") and/or services and/or manage hardware resources (e.g., processors, memory, etc.), which may be utilized by users of the computing device 110 and/or the computing device 120. The computing device 120 may be similar to the computing device 110. In some examples, both the computing devices 110 and computing devices 120 are mobile computing devices, stationary computing devices, server devices, distributed computing platforms, or cloud platform devices. For ease of discussion, the description herein refers to a single computing device 110 and 120, but features and examples of the computing device 120 are applicable to two, three, or more instances of the computing devices 110 and 120.

The computing device 110 and computing device 120 are generally configured to provide access to data stored within the storage processing system 100. The computing devices 110 and 120 may also manage, modify, maintain, and/or store the data. The computing device 110 comprises a database (DB) engine 112 (e.g., SQL Server, Oracle, PostgreSQL, MySQL) configured to host a database or other suitable data, for example, using a data store 118. The data store 118 may be implemented as one or more disks, a network attached storage (NAS), or other suitable shared storage. In some examples, the DB engine 112 is implemented as a storage engine for an email server, such as Microsoft Exchange or another suitable electronic mailbox system. The DB engine 112 uses resources of the computing device 110 (e.g., processors, memory, disks, etc.) to provide access to the database (e.g., reads and writes), maintain backups of the database, and perform other management tasks. Although the example of FIG. 1 is described herein using a database and DB engine, these implementations are included as examples and, in other aspects, may be implemented as a file sharing system (e.g., SharePoint system) or other suitable storage processing system.

The computing device 110 further comprises a backup engine 114 configured to generate backup data structures ("snapshots") of at least some data within the database or data store 118. In some scenarios, the backup data structure stores data from the data store 118, memory, and/or a cache for reversion of the database to the time the backup data structure is generated or created (e.g., a time value related to a creation time of the backup data structure). In some examples, the backup engine 114 includes a backup buffer 115 for storing one or more backup data structures or portions of one or more backup data structures.

A backup data structure generally includes a copy of the database or a portion thereof, along with one or more log files (or log identifiers) identifying suitable transactions or transaction logs, that bring the copy of the database into a consistent state for a reversion using the backup data structure. In some examples, the copy of the database is a sub-portion, such as one or more pages (e.g., where a page is a 32 KB chunk of data), a group of pages (e.g., two or more consecutive pages), or other suitable sub-portion of the database. In some examples, the log files are copies of, or references to, a write-ahead log, transaction log, maintenance log, system log, or other suitable log that is generated by the DB engine 112, the log engine 116, an operating system of the computing device 110, or other suitable entity. In other words, the backup engine 114 does not create the log, but merely copies or creates a reference to another log (e.g., a shortcut or file name for pre-existing logs). In some examples, write-ahead logs generated by the DB engine 112 are stored in a same directory or adjacent directory and the backup data structure includes a reference to the logs (e.g., using a relative path name for an operating system).

Generally, a page within a database hosted by the DB engine 112 includes a header with metadata, such as the revision timestamp (e.g., a DBTime value) or other suitable data. The backup engine 114 generates backup data structures to include a header with metadata, such as a revision timestamp (similar to the DBTime value), references or links to other backup data structures (e.g., for chains of related backup data structures), references or links to log files related to the backup data structure, or other suitable data. The pages of the database and the backup data structures each have a revision timestamp, which indicates a relative age of the pages and backup data structures to each other. In one example, an image of a page is stored when the page in the active database, prior to the flush, is older than the time value related to the creation time of the backup data structure. In another example, when generating a backup data structure, the backup engine 114 determines whether the revision timestamp of a page is greater than a revision timestamp of the backup data structure. When the revision timestamp of the page is greater than the revision timestamp of the backup data structure, the page is more recent than the backup data structure (i.e., more recent than a creation time of the backup data structure) and can be omitted from the backup data structure.

When reverting back to an earlier state corresponding to the backup data structure (i.e., at 1400), the backup engine 114 copies the image of the page (bringing the page to a revision timestamp of 1200) and then replays transactions from logs to bring the database to a revision timestamp of 1400. The transactions to be replayed correspond to a required range of logs for the active database. The required range of logs may comprise logs for transactions that have not yet been committed to the active database. For example, when a transaction changes multiple pages, but at the time the backup data structure is created only some of those pages have been flushed from the memory buffer to the active database, the transaction should be replayed during a reversion to make the active database consistent. When multiple backup data structures are used to revert to an earlier state, the backup engine 114 only replays the required range of logs corresponding to the oldest backup data structure.

In some examples, the system 100 maintains one or more suitable backup logs that may be replayed to take the database to a second state after the backup data structure. The backup logs may be copies of the write-ahead logs in their entirety (e.g., not truncated) so that each transaction may be replayed by the backup engine 114 to revert the database to any desired state after a backup data structure. However, the system 100 avoids a large delay associated with replaying an entire backup log (or set of logs) to reach the desired state. For example, a lag copy that represents a copy of the database that lags behind a current copy by an interval of seven days (i.e., by delaying play back of the backup logs) may need to play back six days' worth of logs to reach a reversion state only one day back. Instead, the images of pages may be copied to the database, where each image may represent multiple lines of a log file, reducing a number of write transactions needed. This approach saves processing and input/output overhead as compared to replaying an entire set of backup logs. In fact, for a worst case scenario when reverting the database, a maximum number of times that a page would be written to would be equal to a number of backup data structures applied for the reversion.

The computing device 110 further comprises the log engine 116 configured to generate and process log files for the DB engine 112. In some examples, the DB engine 112 is configured to use write-ahead logging, where transactions to be entered into the database are first written to the write-ahead log and then entered into the database. The write-ahead log generally allows for recovery of an earlier state of the database, for example, in the event of a power failure, device failure, etc. by allowing for the transactions to be replayed on another copy or version of the database (e.g., a backup, inactive, or redundant copy). In some examples, the log engine 116 is a component or sub-component of the DB engine 112.

In some examples, the log engine 116 is configured to generate multiple logs that, when used together, provide an accurate representation of a current state of the database. In scenarios where the database is maintained in the data store 118 on an array of disks, and also with portions or pages stored within a faster memory (e.g., RAM or cache) for improved access speed relative to the array of disks, the portions within the faster memory may be flushed to the data store 118 at different times, such as when a changed portion reaches a threshold size (e.g., 512 megabytes), when the changed portion or page reaches a threshold age (e.g., 10 minutes), when a flush trigger is received, when memory for a page is to be used for a different page (i.e., flushing a least recently used page), or another suitable time. In some scenarios, a page may have a first version stored in the data store 118, a second version stored in a cache or memory (more recent than the first version), and a third version stored within a write-ahead log (a most recent version).

One or more of the DB engine 112, the backup engine 114, or the log engine 116 may be implemented as software modules, application specific integrated circuits (ASICs), firmware modules, or other suitable implementations, in various embodiments. The data stores 118 may be implemented as one or more of any type of storage mechanism, including a magnetic disc (e.g., in a hard disk drive), an optical disc (e.g., in an optical disk drive), a magnetic tape (e.g., in a tape drive), a memory device such as a random access memory (RAM) device, a read-only memory (ROM) device, etc., and/or any other suitable type of storage medium.

In some examples, a backup data structure is a file that contains one or more records, where each record has a type field, a length field, and a data field or payload field. The type field generally indicates a type of the record or an intended operation for the record. The length field indicates a length or size of the record and the data field includes suitable data or parameters for the record. The data field may include one or more sub-fields, in some examples. By processing the records of the backup data structure, the backup engine 114 reverts the database to an earlier, consistent state, even when data for the database existed in several locations (i.e., data store 118, a cache, and the write-ahead logs) at the time the backup data structure was generated.

Generally, the type indicates an operation to be performed and examples of the types include an attach record, a header record, a page record, a log record, a new page record, an empty page record, fragmentation records, or other suitable records. The attach record (e.g., attach record 410) provides a mapping of a database file path to a database identifier. Since a backup data structure may contain records for multiple database partitions, storing a database file path in every record would be inefficient for storage usage. Instead, the attach record maps the database file path to a more compact identifier (e.g., a short integer) which is then used as a database partition identifier in the records. Within the attach record, the data field may include subfields for the database file path and the database identifier to which the database file path is mapped.

The header record (e.g., header record 420) indicates a database header that has been captured and may be used to stamp a corrected database header after a reversion. Within the header record, the data field may include subfields for the database identifier and a database header (in bytes) to be copied to a database (e.g., after a reversion).

The page record (e.g., page record 430), 440) indicates a page image that has been captured and includes an image of a page of a database to be copied during a reversion. Within the page record, the data field may include subfields for a database identifier, a page number (or other suitable page identifier), one or more flags (e.g., to indicate whether the page has been compressed or if the page is to be marked with a non-revertible delete flag), and the image of the page.

The log record (e.g., log record 450) indicates which logs should be played back to obtain a consistent state for the database. Within the log record, the data field may include subfields for the database identifier, and the log file name (e.g., a path name to a log file generated by the DB engine 112 or the log engine 116). In some examples, the log record indicates a range of log files, for example, using the log file name (e.g., "logfile1225.ldf") and a range identifier for the logs. The range identifier may be a page count for the logs, where a "3" along with a log file name of "logfile1225.ldf" corresponds to log files "logfile1225.ldf", "logfile1226.ldf", and "logfile1227.ldf", for example. Other ways of indicating a range of log files will be apparent to those skilled in the art.

The new page record indicates a page image for a new page, specifically, an empty page. In some examples, new pages may be marked with a particular revision timestamp (e.g., DBTime value) so that after a reversion, the DB engine 112 is able to identify new pages and handle them separately, in some scenarios. Within the new page record, the data field may include subfields for a database identifier and a page number.

The empty page record indicates a range of new pages and generally provides a record of multiple new page records in a more efficient record type (i.e., using less space). Within the empty page record, the data field may include subfields for a database identifier, a first page number in the range, a count of pages in the range, and one or more flags.

The backup engine 114 may perform other operations for capturing and/or reversion using a backup data structure. In some examples, the backup engine 114 collects a page number for various operations and when applying a backup data structure, overwrites those pages with blank pages and a special revision timestamp (e.g., DBTime) to indicate that the page is an expected blank page which was reverted while applying the backup data structure. These scenarios may include when a simple new page operation is performed, when a database is shrunk, or when a table delete operation is performed. When shrinking the database, the backup engine 114 may capture those page numbers to be marked with a special flag so that any log record with such a page before a shrink log record does not result in a failure due to that page being beyond an end of file (EOF).

In some scenarios, backup data structures are divided into sectors so that a checksum may be generated and added to each sector. Sectors may be 8 kilobytes in size (or another suitable size) in some examples, so in some scenarios the record types described above may have a size that extends past an end of one sector. As an example, the sector may store 8000 bytes worth of records and have 192 bytes remaining. Some records, such as a record having an image, may not fit completely within the remaining 192 bytes, but to avoid wasting the remaining space, a fragment start record may encapsulate a first portion of another record and a fragment continuation record may encapsulate a remaining portion of the record. The fragment start record may include a sub-field indicating a remaining size of the encapsulated record. The backup engine 114 may recreate the encapsulated record using the fragment start record and the fragment continuation record by concatenation or other suitable joining technique.

Figure 2:
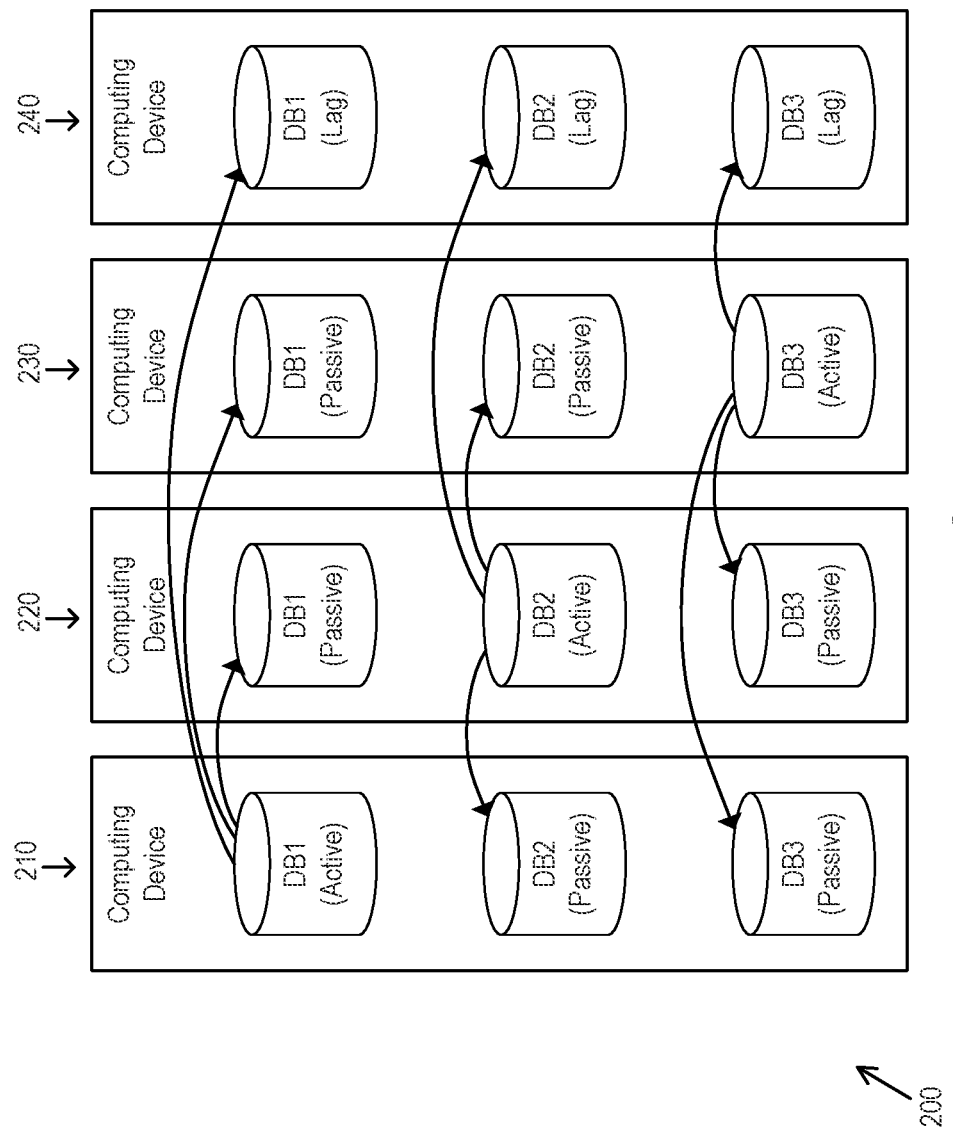
FIG. 2 shows a block diagram of an example of a prior art storage processing system.

FIG. 2 shows a block diagram of an example of a prior art storage processing system 200, including four computing devices 210, 220, 230, and 240 that collectively provide access to three databases (DB1, DB2, and DB3). Copies of the databases are distributed across each of the computing devices 210, 220, 230, and 240 and may be designated as an active copy, a passive copy, or a lag copy, in various examples or configurations. The active copy is generally a copy that is read or written to by users of the database, while the passive copy is not read or written to by users, but maintained as a backup of the active copy (e.g., using a replication process, log file exchange, etc.). The passive copy may be promoted to be an active copy if the active copy is unavailable. In some examples, the passive copy is maintained by sending log files from the active copy to the passive copy and playing back the log files onto the passive copy. The lag copy is similar to the passive copy, but playback of the log files is delayed by a suitable time interval (e.g., 3 hours, 6 hours, 6 days, etc.). In this way, the lag copy provides an older copy of the database that may be used to return to an earlier state of the database. For example, the lag copy allows for reverting back to an earlier state to correct corruption issues or recover items which were deleted by mistake by a user. Generally, playback of the log files on the lag copy may be performed to bring the database to a state from suitable times between the time of the lag copy and the active copy by playing back the logs only up to a desired state.

In the example shown in FIG. 2, the computing device 210 hosts three instances of databases: DB1, DB2, DB3, but with only DB1 being active and DB2 and DB3 being passive. Similarly, the computing devices 220 and 230 host three instances of the databases, but with different active databases. In this way, load on each database is distributed among the computing devices: DB1 on computing device 210, DB2 on computing device 220, and DB3 on computing device 230. The computing device 240 maintains a lag copy of each of the databases. As described above, the lag copies are extra copies of the databases DB1, DB2, and DB3 that are useable for reverting the databases to an earlier state, but cannot be used for access to current data, load balancing, etc. In the event of a failure or other unavailability of the active database or passive databases, the lag copy would need to process or play back a log file to be brought up to a current state, which could take several hours, before the lag copy could be used for access or load balancing. Moreover, this scenario would result in losing the protection of the lag copy.

FIGS. 3A, 3B, and 3C show diagrams of an example database timeline for storage using the system of FIG. 1, according to an example embodiment. A database 300 is shown with three instances 302, 304, and 306 hosted by a DB engine, such as the DB engine 112. The DB engine 112 may distribute the instances 302, 304, and 306 across two, three, or more computing devices (e.g., computing devices 110 or 120). The DB engine 112 hosts the instances 302, 304, and 306 as an active-active group with replication among the instances. With replication, changes that are made at one instance are communicated to the remaining instances. Although three instances are shown, the DB engine 112 may use two instances (e.g., an active-active pair), four instances, or more for additional redundancy, geographic distribution, fault tolerance, etc. in other examples.

The database 300 is shown with four pages 310, 320, 330, and 340 that represent data structures or chunks of data for the database. Although only four pages are shown for clarity, the database 300 may have hundreds, thousands, or more pages. The database 300 includes two tables, a first table 350 that is stored across pages 320 and 330 and a second table 360 that is stored within page 340. In other examples, tables of the database 300 may be stored across three, four, or more pages. Activity within the database 300 is recorded to one or more logs 370 shown as logs 370A, 370B, and 370C, for example, by the log engine 116. In some examples, the logs 370 are transaction logs or write-ahead logs where activity (e.g., adding new data, modifying data, deleting data) within the database is recorded before being performed (e.g., to aid in recovery or reverting the database). Although only six entries among three logs are shown for explanatory purposes, a rate of log entries may exceed five, ten, twenty, or more log entries per minute and many more than three logs may be utilized over the time period portrayed in FIGS. 3A-3C. In some examples, the entries within the logs are spread across, tens, hundreds, or more log files. Generally, the logs 370 account for revisions made to the database between revision timestamps. For example, a first log may account for revision timestamps between 10 and 1000, a second log may account for revision timestamps 1001 to 2000, etc. In some examples, multiple logs that overlap in time are used, for example, to provide separate logs for maintenance transactions, user transactions, administrator transactions, or other suitable transactions.

Each page of the database 300 includes a header having a revision timestamp as described above, for example, headers 312, 322, 332, and 342 with "DBTime" timestamps. As actions are performed on the pages of the database 300, the DB engine 112 updates the revision timestamp of the corresponding header. In the example shown in FIGS. 3A, 3B, and 3C, the revision timestamp is provided as a 24-hour based clock with a start time of 00:00 (e.g., midnight), but in other examples, an integer value or other suitable indication of elapsed time is used.

An available lag database is a database copy or instance which is generally available at all times and up to date, similar to an active copy or passive copy, and has corresponding backup data structures which, in combination, allow for reverting the database 300 back to a state in the past. In other words, the available lag database allows for taking the database 300 back in time, for example, to recover from data corruption or to recover a deleted item. Since the available lag database is available for access by users (e.g., at least for read access), the available lag database provides improved disk space consumption and disk input/output for the system 100 as compared to the lag copy described above with respect to FIG. 2. In some scenarios, the available lag database reduces total disk space for the database 300 relative to the prior art solution shown in FIG. 2 by 25% (i.e., using three instances instead of four instances) and uses 20% less disk input/output for the system 100. In some scenarios, a disk space savings of 25% may correspond to tens of thousands of logs with each log being one megabyte in size. Generally, these improvements are achieved by storing and using backup data structures for reverting the database 300 to an earlier state, instead of storing and using the lag copy and associated logs (i.e., seven days' worth of logs to provide a seven day reversion capability).

The backup engine 114 is configured to generate backup data structures for an active database, such as the instance 302 of the database 300. Example backup data structures 380, 381, 382, 383, and 384 are shown in FIGS. 3A-3C at different times of 12:20 (FIG. 3A), 16:00 (FIG. 3B), and 18:20 (FIG. 3C) for the revision timestamp. In some examples, the backup engine 114 generates the backup data structures 380, 381, 382, 383, and 384 to provide a lag or delay of up to six hours, but additional or fewer backup data structures may be captured in other examples for different delays.

The log engine 116 uses the log 370 to record activity in the database 300. In the described example, the activity corresponds to a recording of meals eaten by a group of users (table 350) and beverages consumed by the group of users (table 360) with entry of subsequent items overwriting earlier items. As shown in the log 370, the activity of the table 350 includes: Breakfast at a revision timestamp of 6:15, Lunch at a revision timestamp of 12:15, a Donut at a revision timestamp of 15:15, and Dinner at a revision timestamp of 18:15. The activity of the table 360 includes: Coffee at a revision timestamp of 6:15 and a Soda at a revision timestamp of 12:45. Additional entries may be included in the log 370 in other examples, but are not shown for clarity. Moreover, the log entries described in the examples herein may be located in many different log files, but are shown in just three log files for clarity.

In the example of FIG. 3A, the backup engine 114 has generated a backup data structure 380 with a revision timestamp of 06:00, the Breakfast and Coffee activity is recorded to the database 300 at 06:15, the backup engine 114 has generated a backup data structure 381 with a revision timestamp of 12:00, and the Lunch activity is recorded to the database 300 at 12:15. The backup data structure 380) contains records 351 of the table 350) (i.e., new page records of page 320 and page 330) and a record 361 of the table 360 (i.e., new page record of page 340) that represent a state of the database 300 (i.e., empty tables 350) and 360) before the Breakfast and Coffee activity has been recorded. Generally, the backup engine 114 determines whether the revision timestamp of a page is greater than a revision timestamp of the backup data structure.

The backup engine 114 omits an image of the page from the backup data structure when the revision timestamp of the page is greater than the revision timestamp of the backup data structure, but captures an image of the page for the backup data structure when the revision timestamp of the page is not greater than the revision timestamp of the backup data structure. Advantageously, the backup engine 114 captures pages only for pages that have been changed, instead of capturing the entire database 300, which saves disk space and input/output overhead. For example, when generating the backup data structure 380 with a revision timestamp of 6:00, page 310 has not changed, so an image of the page 310 is not captured for the backup data structure 380. The pages 320, 330, and 340 have changed and have a revision timestamp of 00:00 (i.e., the revision timestamp before the change is made), which is not greater than the revision timestamp of the backup data structure (06:00), so the backup engine 114 captures the record 351 of the table 350 and the record 361 of the table 360 to represent the empty tables ("[New Page]").

The backup data structure 381 contains images 352 (i.e., an image of pages 320) and 330) that represent a state of the database 300 before the Lunch activity has been recorded (Breakfast at 6:15). Accordingly, at 12:20 shown in FIG. 3A, current data for the database 300 is available in the table 350) (Lunch at 12:15) and the table 360 (Coffee at 6:15) while data from an earlier state (Breakfast at 6:15) is available in the backup data structure 381. In other words, at 12:20, the system 100 may revert to an earlier state by applying the backup data structure 381 to the database 300, resulting in Breakfast and Coffee in the tables 350 and 360, respectively.

In the example of FIG. 3B at 16:00, the backup engine 114 has the backup data structure 381 and has generated a backup data structure 382 with a revision timestamp of 13:00 and a backup data structure 383 with a revision timestamp of 15:00. In some examples, images for different pages are combined within, or appended to, an earlier backup data structure. For example, a backup data structure may be generated to contain images for different pages that were entered within a time interval or range of the backup data structure. In this example, images within the backup data structures are organized by their respective revision timestamps. In one such example, the backup engine 114 may append the image 353 onto the backup data structure 382 instead of generating the backup data structure 383.

Accordingly, at 16:00 shown in FIG. 3B, current data for the database 300 is available in the table 350 (Donut at 15:15) and the table 360 (Soda at 13:45) while data from earlier states are available in the backup data structure 383 (Lunch) and the backup data structure 382 (Coffee). In other words, at a time of 16:00, the system 100 may revert to an earlier state of 12:00 by applying the backup data structure 383 to the database 300, then applying the backup data structure 382 to the database 300, and then applying the backup data structure 381 to the database 300 and its associated logs, resulting in Breakfast and Coffee in the tables 350) and 360, respectively.

In the example of FIG. 3C at 18:20, the backup engine 114 has the backup data structures 382 and 383 and generates a backup data structure 384 with a revision timestamp of 18:00. Accordingly, at 18:20 shown in FIG. 3C, current data for the database 300 is available in the table 350) (Dinner at 18:15) and the table 360 (Soda at 12:45) while data from earlier states is available in the backup data structure 384 (Donut), the backup data structure 383 (Lunch), and the backup data structure 382 (Coffee). As one example, the system 100 may revert to an earlier state at 13:00 by applying each of the backup data structures 384, 383, and 382, in order of newest to oldest, to the database 300.

In some aspects, the backup engine 114 includes the log file 370 itself, a reference to the log file 370, or a portion thereof, within the backup data structures. When the database 300 is reverted to an earlier state, the system 100 applies backup data structures by applying the images, database headers, and restoring the appropriate logs. Generally, the system 100 applies the backup data structures in a reverse chronological order (i.e., oldest first) so that even if a page has images in multiple backup data structures, the last image applied is accurate. In some examples, an in-memory bitmap of pages applied is maintained by the backup engine 114 which is reset after each backup data structure is applied. The bitmap is used to skip applying a page image when the backup engine 114 had already captured one as part of this backup data structure.

In some examples, the backup engine 114 generates a backup data structure at a fixed time interval (e.g., every 6 hours, 5 days, or other suitable interval) to allow for reversions and stores the appropriate log file 370 to bring the database 300 to a consistent state after the reversion.

The backup engine 114 captures images of pages on write latch of the page (e.g., locking the page to copy an updated version from memory onto a disk), in some examples. Generally, the backup engine 114 checks if the revision timestamp on the page of the active database is lower than the revision timestamp for the backup data structure and if so, captures the image. This check helps the backup engine 114 to avoid capturing a page image repeatedly even if the page has been updated thousands of times after the backup data structure was created. In some scenarios, the backup engine 114 captures an image outside of the write latch path, such as when the system 100 unleaks pages, it captures the images of the pages that were unleaked.

FIG. 4 shows an example diagram of a backup data structure 400, according to an example embodiment. The backup data structure 400 includes an attach record 410, a header record 420, page records 430 and 440, and a log record 450. As described above, the attach record 410 includes a database file path ("F:\Database\ABC_CORP\CustomerResourceManagement.mdf") that is mapped to a more compact identifier, such as a shortened string ("DB-1") as shown in FIG. 4, a short integer, or other suitable identifier. In the example shown in FIG. 4, the backup data structure 400 includes four additional records that refer to the same database using the shortened string, saving space by omitting multiple instances of the explicit database file path.

In some examples, the backup engine 114 maintains the backup data structure 400 in a backup buffer 115 (e.g., an in-memory buffer), for example, to allow for updates to the backup data structure 400 and/or to avoid having to write small amounts of data to disk when creating a backup data structure (e.g., performing a write command every time a record is added to the backup data structure 400), thereby improving input/output efficiency. In some examples, the backup engine 114 utilizes a plurality of backup buffers 115, for example, one backup buffer 115 per database, per database partition, etc. The backup buffer 115 may be 256 megabytes, 512 megabytes, or another suitable size. However, the backup engine 114 is configured to flush the backup buffer 115 in various scenarios. In a first scenario, the backup engine 114 flushes the backup buffer 115 when the backup buffer 115 becomes full. In a second scenario, the backup engine 114 flushes the backup buffer 115 when images for pages are captured outside of the write latch path, such as when a table delete or shrink operation is performed. In a third scenario, the backup engine 114 flushes the backup buffer 115 when data within the backup buffer 115 has not been written out within a suitable flush interval (e.g., one minute, twenty minutes, etc.).

In a fourth scenario, the backup engine 114 flushes the backup buffer 115 when an actual page, for which an image is stored in the backup buffer 115, is about to be flushed to the disk. This ensures that the image of the page is captured in the backup data structure before that image of the page in the database is overwritten by the update and thus ensures that the backup engine 114 is crash consistent when applying images. To do this, when the backup engine 114 captures the image, the backup engine 114 records the backup data structure position of the image in the page buffer. When the actual page within the database is about to be written, the backup engine 114 compares the current backup data structure position with the one for the page. If the current backup data structure position is in the same buffer as the image's backup data structure position, the buffer is flushed to the disk before the page.

In some scenarios, a passive copy of a database may be incrementally reseeded or page patched to correct for a divergence between data stored in the active copy and the passive copy, for example, due to a hardware failure in the data store 118 of the computing device 110 for the passive copy causing it to lose a page flush and thereby causing divergence. During an incremental reseed, the divergence between the active copy and the passive copy of the database is identified, for example, by comparing the write-ahead logs of the active copy and the passive copy in case logs are diverged. During the incremental reseed, the pages in the diverged write-ahead logs are identified and patched on the passive copy from the active copy. In some scenarios, patching pages causes the passive copy to lose its previous image on the disk.

In some scenarios where a backup data structure was created before the point of divergence, the backup engine 114 reads the revision timestamp of the pages on disk for the pages being patched during the incremental reseed and captures an image of the pages on the disk into the backup data structure (e.g., appending a page record with the image onto the backup data structure) when the revision timestamp is lower than the revision timestamp of the backup data structure to avoid losing the image once the image has been patched. This step saves images of pages for diverged logs that have not yet been replayed and for logs that have not yet been flushed. When the patched version of a page has a revision timestamp that is less than the revision timestamp of the backup data structure, the backup engine 114 captures the image of the patched version of the page.

In some scenarios, a current backup data structure is created after the point of divergence or the point of divergence is within the log (i.e., the log files that bring the database to a consistent state). In these scenarios, the backup engine 114 rolls images from the current backup data structure into a previous backup data structure if the revision timestamp of the image is lower than the revision timestamp of the previous backup data structure, since if it is higher some image of the page should have already been captured when it moved to the higher timestamp, and then deletes the current backup data structure. In other words, records related to page images within the current backup data structure (i.e., page record, log record) are appended to the previous backup data structure, then the current backup data structure (containing images that are after the point of divergence) is deleted.

FIG. 5 shows a flowchart of an example method 500 for database reversion, according to an example embodiment. Technical processes shown in these figures will be performed automatically unless otherwise indicated. In any given embodiment, some steps of a process may be repeated, perhaps with different parameters or data to operate on. Steps in an embodiment may also be performed in a different order than the top-to-bottom order that is laid out in FIG. 5. Steps may be performed serially, in a partially overlapping manner, or fully in parallel. Thus, the order in which steps of method 500 are performed may vary from one performance to the process of another performance of the process. Steps may also be omitted, combined, renamed, regrouped, be performed on one or more machines, or otherwise depart from the illustrated flow, provided that the process performed is operable and conforms to at least one claim. The steps of FIG. 5 may be performed by the computing device 110 (e.g., via the DB engine 112, the backup engine 114, the log engine 116), or other suitable computing device.

Method 500 begins with step 502. At step 502, an active database and a passive (available lag) database are hosted and the active database is replicated to the passive database. The passive database and the active database may correspond to the instances 302 and 304, respectively, described above. In some examples, the replication corresponds to performing bi-directional replication between the active database and the passive database. The active database and the passive database may be replicated as an active-passive pair or active-active pair, in various aspects. In some examples, step 502 also includes generating transaction logs for transactions affecting the active database and the passive database. For example, the log engine 116 maintains the log file 370. The active database comprises a plurality of pages, but the method 500 generally refers to a single page ("the page") for ease of description. The page has an associated page timestamp indicating a most recent update of the page in the active database. In some examples, the page timestamp is a DBTime for when the page was most recently updated in the active database.

At step 504, the system 100 creates a first backup data structure to allow for database reversion for the active database. The backup data structure is separate from the active database and the passive database and has a time value related to a creation time of the backup data structure. In some examples, the time value is a DBTime for when the backup data structure was created. Generally, the backup data structure may be used for reverting the passive database to a first state corresponding to the first backup data structure. The first backup data structure generally corresponds to any of the backup data structures 380, 381, 382, 383, or 384. In some examples, the first backup data structure comprises images of a subset of the plurality of pages of the active database.

At step 506, the database engine 112 copies the page in the active database to a memory buffer separate from the active database, updates the copy of the page in the memory buffer, and flushes the updated copy of the page in the memory buffer to the active database. Generally, the flushing causes the updated copy of the page in the memory buffer to replace the page in the active database. In some examples, the flushing involves multiple pages in the memory buffer that are to be copied back to the active database.

Copying the page to the memory buffer generally provides faster access to reading and/or writing to the page, for example, where the memory buffer is in a lower latency, random access memory of a server while the active database is stored within a higher latency disk drive (hard disk drive or solid state disk). In some examples, the database engine 112 copies the page in the active database to the memory buffer in response to a first database operation (e.g., a Select SQL command) and updates the copy of the page in the memory buffer in response to a second database operation (e.g., an Update SQL command). The first and second database operations may be sequential operations or separated by one or more other database operations. In other examples, the database engine 112 copies the page in the active database to the memory buffer and updates the copy of the page in the memory buffer in response to a single command (e.g., an Update SQL command).

At step 508, prior to the flushing of the updated copy of the page in the memory buffer to the active database, the backup engine 114 stores an image of the page in the active database to the first backup data structure when the page in the active database, prior to the flush, is older than the time value related to the creation time of the backup data structure (e.g., when a revision timestamp of the page is not greater than the revision timestamp of the first backup data structure). In this way, the backup engine 114 stores a "pre-image" of the page as the page existed in the active database before the flush was performed. In the event that the page is flushed again at a later time, verifying that the page in the active database is older than the backup data structure allows for subsequent flushes to omit capturing an image of the page in the active database for the first backup data structure when the revision timestamp of the page in the active database is greater than the revision timestamp of the first backup data structure. In this way, multiple copies of the same page are not stored in the backup data structure, saving disk space and disk input/output operations. When multiple pages within the memory buffer are flushed, the backup engine 114 stores, within the backup data structure, images of those pages that are older than the time value related to the creation time of the backup data structure. Moreover, images of pages that are flushed at a later time (e.g., during a separate flush) may be stored within the backup data structure by appending the images to the backup data structure, as described above.

At step 510, a request is received to revert the passive database to a requested time. The request may be received through the database engine 112 or the backup engine 114, in various examples. The requested time may be a DBTime for the active database, a date and time of day (e.g., Jan. 2, 2022, 08:33:22 UTC), or other suitable indication of time. In some examples, the request may be received to revert the active database instead of the passive database.

At step 512, the backup engine 114 identifies the backup data structure based on the requested time and the time value associated with the backup data structure. In some aspects, the backup engine 114 compares time values associated with a plurality of backup data structures with the requested time and identifies the backup data structure having a time value that is closest to and older than the requested time. For example, where a plurality of backup data structures have time values of 10:00 AM, 10:30 AM, 11:00 AM, 11:30 AM, and 12:00 PM and the requested time is 11:02 AM, the backup engine 114 identifies the backup data structure corresponding to the 11:00 AM time value.

At step 514, the backup engine 114 reverts the passive database to the requested time using the identified backup data structure to copy the image of the page to the passive database. Generally, the backup engine 114 copies the images of the pages from the backup data structure to the passive database, which brings the passive database to a first state, but this first state may not be a consistent state, for example, where a single transaction resulted in changes to multiple pages and only some of those pages have been flushed back to the active database. In some examples, the method 500 further comprises identifying log identifiers for a required range of logs that bring the active database to a consistent state as of the time value related to the creation time of the backup data structure and storing the identified log identifiers in the backup data structure. The method 500 may further comprise replaying the required range of logs according to the identified log identifiers onto the passive database after copying the image of the first page to the passive database to revert the passive database to the requested time.

In some aspects, step 514 includes replaying at least some of the transaction logs onto the passive database after replaying the required range of logs. The at least some of the transaction logs correspond to transactions between the time value related to the creation time of the backup data structure and the requested time. Using the example above, when the backup data structure has a time value of 11:00 AM but the requested time is 11:02 AM, the at least some of the transaction logs correspond to transactions between 11:00 AM and 11:02 AM.

In some examples, step 514 includes sequentially applying a plurality of backup data structures using most recent backup data structures of the plurality of backup data structures first, the plurality of backup data structures comprising the first backup data structure as an oldest backup data structure and one or more remaining backup data structures. Reverting the passive database to the second state may further include omitting playback of transaction logs identified by remaining log identifiers for the remaining one or more backup data structures to reach the second state. In other words, when multiple backup data structures are used to revert to an earlier state, the backup engine 114 only replays the logs corresponding to the oldest backup data structure. Using the example above with 11:02 AM as the requested time, the backup engine 114 copies images from the backup data structure of 12:00 PM, then copies images from the backup data structure of 11:30 AM, and then copies images from the backup data structure of 11:00 AM. After copying the images from the backup data structure of 11:00 AM, the backup engine 114 replays the transactions corresponding to the identified log identifiers in the backup data structure of 11:00 AM. Notably, transactions corresponding to log identifiers in the backup data structures of 11:30 AM and 12:00 PM are not replayed when reverting the passive database to the 11:02 AM state.

In some aspects, the method 500 further comprises transferring the backup data structure from a first computing device that hosts the active database to a second computing device that hosts the passive database, and reverting the passive database to the first state using the first backup data structure. For example, one or more of the backup data structures 380, 381, 382, 383, and 384 may be transferred from the computing device 110 to the computing device 120 for reverting an instance of the database 300 on the computing device 120.

In some aspects, the method 500 includes maintaining a backup buffer (e.g., backup buffer 115) in memory for the first backup data structure. In one such example, the first backup data structure is maintained in memory instead of being stored directly to a disk drive to reduce I/O activity on the disk drive. The backup engine 114 may update the first backup data structure in the memory and then flush the backup buffer when a threshold size is reached (e.g., the backup data structure reaches 512 MB or another suitable size), when a buffered page of the DB engine 112 corresponding to a buffered image in the backup buffer is flushed to the page, or another suitable trigger. In some aspects, when the actual page for which an image is stored in the backup buffer is about to be flushed to the disk, the image of the page is captured in the backup data structure before that image of the page in the database is overwritten by the update. This ensures that the backup engine 114 is crash consistent when applying images. To do this, when the backup engine 114 captures the image, the backup engine 114 records the backup data structure position of the image in the page buffer. When the actual page within the database is about to be written, the backup engine 114 compares the current backup data structure position with the one for the page. If the current backup data structure position is in the same buffer as the image's backup data structure position, the buffer is flushed to the disk before the page.

In some aspects, table deletes may be resource intensive for backup data structures, especially when the table being deleted is on the order of 10s of GBs. Generally, the DB engine 112 does not modify the pages of a table that has been deleted, but updates space trees and a table root page for the DB engine 112 related to the database 300.

To maintain consistency of the database 300 after it is reverted back in time, the backup engine 114 captures images of all the pages of a table being deleted by reading the pages from disk and writing them to the backup data structure.

Some table deletes happen due to a load balancer moving mailboxes or tables around and deleting the mailboxes or tables from their previous location. Technically, when a mailbox is migrated from one database to another and eventually deleted on the old database, there is no need to revert the table back since it would have been moved to the other database anyways. For these cases, the backup engine 114 skips capturing the images to improve disk input/output performance, but takes additional steps for these "non-revertible table deletes." When the backup engine 114 reverts the database 300 back to a time when a table might have still existed, the backup engine 114 reverts the catalog page as well, which would have the table entries. Accordingly, the backup engine 114 redeletes the table and blocks other operations on the table. For redeletion after a revert, the backup engine 114 captures images of table root pages and the space tree pages of the DB engine 112 as part of delete operation, but omits capture of images for data within the table. When the backup engine 114 reverts the database, the root page of such a table is marked with a special flag (fPageTableDelete) to indicate that the table needs to be deleted. The reason this cannot be marked on the catalog itself is because the catalog page would be diverged with the catalog page of a passive copy. The DB engine 112 redeletes this table when it gets to the table root page which is marked with this special flag.

For blocking operations on secondary tables belonging to a deleted table (e.g., a secondary index, LV table), the backup engine 114 also captures the image of a root page of the LV table and secondary index tables and also marks them with the special flag fPageTableDelete. In this way, updates to the table marked with the special flag is indicated as failed with error by the DB engine 112 when the root page is accessed.

FIGS. 6, 7, and 8 and the associated descriptions provide a discussion of a variety of operating environments in which aspects of the disclosure may be practiced. However, the devices and systems illustrated and discussed with respect to FIGS. 6, 7, and 8 are for purposes of example and illustration and are not limiting of a vast number of computing device configurations that may be utilized for practicing aspects of the disclosure, as described herein.

FIG. 6 is a block diagram illustrating physical components (e.g., hardware) of a computing device 600 with which aspects of the disclosure may be practiced. The computing device components described below may have computer executable instructions for implementing a storage processing application 620 on a computing device (e.g., computing device 110, computing device 120), including computer executable instructions for storage processing application 620 that can be executed to implement the methods disclosed herein. In a basic configuration, the computing device 600 may include at least one processing unit 602 and a system memory 604. Depending on the configuration and type of computing device, the system memory 604 may comprise, but is not limited to, volatile storage (e.g., random access memory), non-volatile storage (e.g., read-only memory), flash memory, or any combination of such memories. The system memory 604 may include an operating system 605 and one or more program modules 606 suitable for running storage processing application 620, such as one or more components with regard to FIGS. 1 and 3 and, in particular, DB engine 621 (e.g., corresponding to DB engine 112), backup engine 622 (e.g., corresponding to backup engine 114), and log engine 623 (e.g., corresponding to log engine 116).

The operating system 605, for example, may be suitable for controlling the operation of the computing device 600. Furthermore, embodiments of the disclosure may be practiced in conjunction with a graphics library, other operating systems, or any other application program and is not limited to any particular application or system. This basic configuration is illustrated in FIG. 6 by those components within a dashed line 608. The computing device 600 may have additional features or functionality. For example, the computing device 600 may also include additional data storage devices (removable and/or non-removable) such as, for example, magnetic disks, optical disks, or tape. Such additional storage is illustrated in FIG. 6 by a removable storage device 609 and a non-removable storage device 610.

As stated above, a number of program modules and data files may be stored in the system memory 604. While executing on the processing unit 602, the program modules 606 (e.g., storage processing application 620) may perform processes including, but not limited to, the aspects, as described herein. Other program modules that may be used in accordance with aspects of the present disclosure, and in particular for storage processing, may include DB engine 621, backup engine 622, or log engine 623.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 6 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 600 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

The computing device 600 may also have one or more input device(s) 612 such as a keyboard, a mouse, a pen, a sound or voice input device, a touch or swipe input device, etc. The output device(s) 614 such as a display, speakers, a printer, etc. may also be included. The aforementioned devices are examples and others may be used. The computing device 600 may include one or more communication connections 616 allowing communications with other computing devices 650. Examples of suitable communication connections 616 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 604, the removable storage device 609, and the non-removable storage device 610 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 600. Any such computer storage media may be part of the computing device 600. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

FIGS. 7 and 8 illustrate a mobile computing device 700, for example, a mobile telephone, a smart phone, wearable computer (such as a smart watch), a tablet computer, a laptop computer, and the like, with which embodiments of the disclosure may be practiced. In some aspects, the client may be a mobile computing device. With reference to FIG. 7, one aspect of a mobile computing device 700 for implementing the aspects is illustrated. In a basic configuration, the mobile computing device 700 is a handheld computer having both input elements and output elements. The mobile computing device 700 typically includes a display 705 and one or more input buttons 710 that allow the user to enter information into the mobile computing device 700. The display 705 of the mobile computing device 700 may also function as an input device (e.g., a touch screen display). If included, an optional side input element 715 allows further user input. The side input element 715 may be a rotary switch, a button, or any other type of manual input element. In alternative aspects, mobile computing device 700 may incorporate more or less input elements. For example, the display 705 may not be a touch screen in some embodiments. In yet another alternative embodiment, the mobile computing device 700 is a portable phone system, such as a cellular phone. The mobile computing device 700 may also include an optional keypad 735. Optional keypad 735 may be a physical keypad or a "soft" keypad generated on the touch screen display. In various embodiments, the output elements include the display 705 for showing a graphical user interface (GUI), a visual indicator 720 (e.g., a light emitting diode), and/or an audio transducer 725 (e.g., a speaker). In some aspects, the mobile computing device 700 incorporates a vibration transducer for providing the user with tactile feedback. In yet another aspect, the mobile computing device 700 incorporates input and/or output ports, such as an audio input (e.g., a microphone jack), an audio output (e.g., a headphone jack), and a video output (e.g., a HDMI port) for sending signals to or receiving signals from an external device.

FIG. 8 is a block diagram illustrating the architecture of one aspect of a mobile computing device. That is, the mobile computing device 700 can incorporate a system (e.g., an architecture) 802 to implement some aspects. In one embodiment, the system 802 is implemented as a "smart phone" capable of running one or more applications (e.g., browser, e-mail, calendaring, contact managers, messaging clients, games, and media clients/players). In some aspects, the system 802 is integrated as a computing device, such as an integrated personal digital assistant (PDA) and wireless phone.

One or more application programs 866 may be loaded into the memory 862 and run on or in association with the operating system 864. Examples of the application programs include phone dialer programs, e-mail programs, personal information management (PIM) programs, word processing programs, spreadsheet programs, Internet browser programs, messaging programs, and so forth. The system 802 also includes a non-volatile storage area 868 within the memory 862. The non-volatile storage area 868 may be used to store persistent information that should not be lost if the system 802 is powered down. The application programs 866 may use and store information in the non-volatile storage area 868, such as email or other messages used by an email application, and the like. A synchronization application (not shown) also resides on the system 802 and is programmed to interact with a corresponding synchronization application resident on a host computer to keep the information stored in the non-volatile storage area 868 synchronized with corresponding information stored at the host computer.

The system 802 has a power supply 870, which may be implemented as one or more batteries. The power supply 870 may further include an external power source, such as an AC adapter or a powered docking cradle that supplements or recharges the batteries.

The system 802 may also include a radio interface layer 872 that performs the function of transmitting and receiving radio frequency communications. The radio interface layer 872 facilitates wireless connectivity between the system 802 and the "outside world," via a communications carrier or service provider. Transmissions to and from the radio interface layer 872 are conducted under control of the operating system 864. In other words, communications received by the radio interface layer 872 may be disseminated to the application programs 866 via the operating system 864, and vice versa.

The visual indicator 820 may be used to provide visual notifications, and/or an audio interface 874 may be used for producing audible notifications via an audio transducer 725 (e.g., audio transducer 725 illustrated in FIG. 7). In the illustrated embodiment, the visual indicator 820 is a light emitting diode (LED) and the audio transducer 725 may be a speaker. These devices may be directly coupled to the power supply 870 so that when activated, they remain on for a duration dictated by the notification mechanism even though the processor 860 and other components might shut down for conserving battery power. The LED may be programmed to remain on indefinitely until the user takes action to indicate the powered-on status of the device. The audio interface 874 is used to provide audible signals to and receive audible signals from the user. For example, in addition to being coupled to the audio transducer 725, the audio interface 874 may also be coupled to a microphone to receive audible input, such as to facilitate a telephone conversation. In accordance with embodiments of the present disclosure, the microphone may also serve as an audio sensor to facilitate control of notifications, as will be described below. The system 802 may further include a video interface 876 that enables an operation of peripheral device 830 (e.g., on-board camera) to record still images, video stream, and the like.

A mobile computing device 700 implementing the system 802 may have additional features or functionality. For example, the mobile computing device 700 may also include additional data storage devices (removable and/or non-removable) such as, magnetic disks, optical disks, or tape. Such additional storage is illustrated in FIG. 8 by the non-volatile storage area 868.

Data/information generated or captured by the mobile computing device 700 and stored via the system 802 may be stored locally on the mobile computing device 700, as described above, or the data may be stored on any number of storage media that may be accessed by the device via the radio interface layer 872 or via a wired connection between the mobile computing device 700 and a separate computing device associated with the mobile computing device 700, for example, a server computer in a distributed computing network, such as the Internet. As should be appreciated such data/information may be accessed via the mobile computing device 700 via the radio interface layer 872 or via a distributed computing network. Similarly, such data/information may be readily transferred between computing devices for storage and use according to well-known data/information transfer and storage means, including electronic mail and collaborative data/information sharing systems.

As should be appreciated, FIGS. 7 and 8 are described for purposes of illustrating the present methods and systems and is not intended to limit the disclosure to a particular sequence of steps or a particular combination of hardware or software components.

In accordance with examples of the present disclosure, a system for database reversion comprises a database engine configured to host an active database and a passive database and to replicate the active database to the passive database, wherein the active database comprises a plurality of pages, wherein a page in the active database has an associated page timestamp indicating a most recent update of the page in the active database. The system further comprises a log engine configured to generate transaction logs for transactions affecting the active database and a backup engine configured to create a backup data structure to allow for database reversion for the active database, the backup data structure being separate from the active database and the passive database and having a time value related to a creation time of the backup data structure. The system further comprises a memory buffer separate from the active database. The database engine is configured to: copy the page in the active database to the memory buffer, update the copy of the page in the memory buffer, and flush the updated copy of the page in the memory buffer to the active database, wherein the flush causes the updated copy of the page in the memory buffer to replace the page in the active database. The backup engine is configured to, prior to the flush of the updated copy of the page in the memory buffer to the active database, store an image of the page in the active database to the backup data structure when the page in the active database, prior to the flush, is older than the time value related to the creation time of the backup data structure. The backup engine is further configured to receive a request to revert the passive database to a requested time, identify the backup data structure based on the requested time and the time value associated with the backup data structure, and revert the passive database to the requested time using the identified backup data structure to copy the image of the page to the passive database. In an example, the backup engine is configured to identify log identifiers for a required range of logs that bring the active database to a consistent state as of the time value related to the creation time of the backup data structure, and store the identified log identifiers in the backup data structure. In an example, the database engine is configured to replay the required range of logs according to the identified log identifiers onto the passive database after copying the image of the page to the passive database to revert the passive database to the requested time. In an example, the database engine is configured to replay at least some of the transaction logs onto the passive database after replaying the required range of logs according to the identified log identifiers, wherein the at least some of the transaction logs correspond to transactions between the time value related to the creation time of the backup data structure and the requested time. In an example, the backup data structure is a first backup data structure; the database engine is configured to sequentially apply a plurality of backup data structures using most recent backup data structures of the plurality of backup data structures first; wherein the plurality of backup data structures comprises the first backup data structure as an oldest backup data structure and one or more remaining backup data structures; and wherein the backup engine is configured to use the one or more remaining backup data structures to copy images of pages from the one or more remaining backup data structures to the passive database without replaying required ranges of logs according to remaining log identifiers of the one or more remaining backup data structures. In an example, the backup data structure comprises images of a subset of the plurality of pages of the active database. In an example, the database engine is distributed across multiple computing devices and configured for bi-directional replication between the active database and the passive database. In an example, the backup engine is configured to transfer the backup data structure from a first computing device that hosts the active database to a second computing device that hosts the passive database. In an example, the system further comprising a backup buffer, wherein the backup engine is configured to maintain the backup data structure in the backup buffer, and to flush the backup buffer when a buffered page of the database engine corresponding to a buffered image in the backup buffer is flushed. In an example, the backup engine is configured to determine whether a table within the active database has been deleted for the backup data structure, and when the table has been deleted, omit storing images for data within the table in the backup data structure, store images of a table root page and space tree pages of the table in the backup data structure, and append a table delete record to the backup data structure to cause an update to the space tree pages and the table root page when reverting the passive database.

In accordance with further examples of the present disclosure, a method for database reversion comprises: hosting an active database and a passive database, wherein the active database comprises a plurality of pages, wherein a page in the active database has an associated page timestamp indicating a most recent update of the page in the active database; replicating the active database to the passive database; creating a backup data structure to allow for database reversion for the active database, the backup data structure being separate from the active database and the passive database and having a time value related to a creation time of the backup data structure; copying the page in the active database to a memory buffer separate from the active database; updating the copy of the page in the memory buffer; flushing the updated copy of the page in the memory buffer to the active database, wherein the flushing causes the updated copy of the page in the memory buffer to replace the page in the active database; prior to the flushing of the updated copy of the page in the memory buffer to the active database, storing an image of the page in the active database to the backup data structure when the page in the active database, prior to the flush, is older than the time value related to the creation time of the backup data structure, receiving a request to revert the passive database to a requested time; identifying the backup data structure based on the requested time and the time value associated with the backup data structure; and reverting the passive database to the requested time using the identified backup data structure to copy the image of the page to the passive database. In an example, the method comprises generating transaction logs for transactions affecting the active database; identifying log identifiers for a required range of logs that bring the active database to a consistent state as of the time value related to the creation time of the backup data structure; storing the identified log identifiers in the backup data structure. In an example, the method further comprises replaying the required range of logs according to the identified log identifiers onto the passive database after copying the image of the page to the passive database to revert the passive database to the requested time. In an example, the method further comprises replaying at least some of the transaction logs onto the passive database after replaying the required range of logs, wherein the at least some of the transaction logs correspond to transactions between the time value related to the creation time of the backup data structure and the requested time. In an example, the backup data structure is a first backup data structure, the method further comprising sequentially applying a plurality of backup data structures using most recent backup data structures of the plurality of backup data structures first, the plurality of backup data structures comprising the first backup data structure as an oldest backup data structure and one or more remaining backup data structures, including: using the one or more remaining backup data structures to copy images of pages to the passive database without replaying required ranges of logs according to remaining log identifiers of the one or more remaining backup data structures.

In accordance with further examples of the present disclosure, a non-transient computer-readable storage medium comprising instructions being executable by one or more processors to cause the one or more processors to: host an active database and a passive database, wherein the active database comprises a plurality of pages, wherein a page in the active database has an associated page timestamp indicating a most recent update of the page in the active database; replicate the active database to the passive database; create a backup data structure to allow for database reversion for the active database, the backup data structure being separate from the active database and the passive database and having a time value related to a creation time of the backup data structure; copy the page in the active database to a memory buffer separate from the active database; update the copy of the page in the memory buffer; flush the updated copy of the page in the memory buffer to the active database, wherein the flushing causes the updated copy of the page in the memory buffer to replace the page in the active database; prior to the flushing of the updated copy of the page in the memory buffer to the active database, store an image of the page in the active database to the backup data structure when the page in the active database, prior to the flush, is older than the time value related to the creation time of the backup data structure, receive a request to revert the passive database to a requested time; identify the backup data structure based on the requested time and the time value associated with the backup data structure; and revert the passive database to the requested time using the identified backup data structure to copy the image of the page to the passive database. In an example, the instructions further cause the one or more processors to: generate transaction logs for transactions affecting the active database; identify log identifiers for a required range of logs that bring the active database to a consistent state as of the time value related to the creation time of the backup data structure; store the identified log identifiers in the backup data structure. In an example, the instructions further cause the one or more processors to: replay the required range of logs according to the identified log identifiers onto the passive database after copying the image of the first page to the passive database to revert the passive database to the requested time. In an example, the instructions further cause the one or more processors to: replay at least some of the transaction logs onto the passive database after replaying the required range of logs according to the identified log identifiers, wherein the at least some of the transaction logs correspond to transactions between the time value related to the creation time of the backup data structure and the requested time. In an example, the instructions further cause the one or more processors to: sequentially apply a plurality of backup data structures using most recent backup data structures of the plurality of backup data structures first, the plurality of backup data structures comprising the first backup data structure as an oldest backup data structure and one or more remaining backup data structures, including using the one or more remaining backup data structures to copy images of pages to the passive database without replaying required ranges of logs according to remaining log identifiers of the one or more remaining backup data structures.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A system for database reversion, the system comprising:
   a database engine configured to host an active database and a passive database and to replicate the active database to the passive database, wherein the active database comprises a plurality of pages, wherein a page in the active database has an associated page timestamp indicating a most recent update of the page in the active database;
   a log engine configured to generate transaction logs for transactions affecting the active database;
   a backup engine configured to create a backup data structure to allow for database reversion for the active database, the backup data structure being separate from the active database and the passive database and having a time value related to a creation time of the backup data structure; and
   a memory buffer separate from the active database;
   wherein the database engine is configured to:
      copy the page in the active database to the memory buffer,
      update the copy of the page in the memory buffer, and
      flush the updated copy of the page in the memory buffer to the active database, wherein the flush causes the updated copy of the page in the memory buffer to replace the page in the active database;
   wherein the backup engine is configured to, prior to the flush of the updated copy of the page in the memory buffer to the active database, store an image of the page in the active database to the backup data structure when the page in the active database, prior to the flush, is older than the time value related to the creation time of the backup data structure; and
   wherein the backup engine is further configured to receive a request to revert the passive database to a requested time, identify the backup data structure based on the requested time and the time value related to the creation time of the backup data structure, and revert the passive database to the requested time using the identified backup data structure to copy the image of the page to the passive database.

2. The system of claim 1, wherein the backup engine is configured to identify log identifiers for a required range of logs that bring the active database to a consistent state as of the time value related to the creation time of the backup data structure, and store the identified log identifiers in the backup data structure.

3. The system of claim 2, wherein the database engine is configured to replay the required range of logs according to the identified log identifiers onto the passive database after copying the image of the page to the passive database to revert the passive database to the requested time.

4. The system of claim 3, wherein the database engine is configured to replay at least some of the transaction logs onto the passive database after replaying the required range of logs according to the identified log identifiers, wherein the at least some of the transaction logs correspond to transactions between the time value related to the creation time of the backup data structure and the requested time.

5. The system of claim 3, wherein:
   the backup data structure is a first backup data structure;
   the database engine is configured to sequentially apply a plurality of backup data structures using most recent backup data structures of the plurality of backup data structures first;
   wherein the plurality of backup data structures comprises the first backup data structure as an oldest backup data structure and one or more remaining backup data structures; and
   wherein the backup engine is configured to use the one or more remaining backup data structures to copy images of pages from the one or more remaining backup data structures to the passive database without replaying required ranges of logs according to remaining log identifiers of the one or more remaining backup data structures.

6. The system of claim 1, wherein the backup data structure comprises images of a subset of the plurality of pages of the active database.

7. The system of claim 1, wherein the database engine is distributed across multiple computing devices and configured for bi-directional replication between the active database and the passive database.

8. The system of claim 7, wherein the backup engine is configured to transfer the backup data structure from a first computing device that hosts the active database to a second computing device that hosts the passive database.

9. The system of claim 1, wherein the system further comprising a backup buffer, wherein the backup engine is configured to maintain the backup data structure in the backup buffer, and to flush the backup buffer when a buffered page of the database engine corresponding to a buffered image in the backup buffer is flushed.

10. The system of claim 1, wherein the backup engine is configured to determine whether a table within the active database has been deleted for the backup data structure, and when the table has been deleted,
   omit storing images for data within the table in the backup data structure,
   store images of a table root page and space tree pages of the table in the backup data structure, and
   append a table delete record to the backup data structure to cause an update to the space tree pages and the table root page when reverting the passive database.

11. A method for database reversion, wherein the method comprising:
- hosting an active database and a passive database, wherein the active database comprises a plurality of pages, wherein a page in the active database has an associated page timestamp indicating a most recent update of the page in the active database;
- replicating the active database to the passive database;
- creating a backup data structure to allow for database reversion for the active database, the backup data structure being separate from the active database and the passive database and having a time value related to a creation time of the backup data structure;
- copying the page in the active database to a memory buffer separate from the active database;
- updating the copy of the page in the memory buffer;
- flushing the updated copy of the page in the memory buffer to the active database, wherein the flushing causes the updated copy of the page in the memory buffer to replace the page in the active database;
- prior to the flushing of the updated copy of the page in the memory buffer to the active database, storing an image of the page in the active database to the backup data structure when the page in the active database, prior to the flush, is older than the time value related to the creation time of the backup data structure;
- receiving a request to revert the passive database to a requested time;
- identifying the backup data structure based on the requested time and the time value related to the creation time of the backup data structure; and
- reverting the passive database to the requested time using the identified backup data structure to copy the image of the page to the passive database.

12. The method of claim 11, wherein the method further comprising:
- generating transaction logs for transactions affecting the active database;
- identifying log identifiers for a required range of logs that bring the active database to a consistent state as of the time value related to the creation time of the backup data structure; and
- storing the identified log identifiers in the backup data structure.

13. The method of claim 12, wherein the method further comprising:
- replaying the required range of logs according to the identified log identifiers onto the passive database after copying the image of the page to the passive database to revert the passive database to the requested time.

14. The method of claim 13, further comprising replaying at least some of the transaction logs onto the passive database after replaying the required range of logs, wherein the at least some of the transaction logs correspond to transactions between the time value related to the creation time of the backup data structure and the requested time.

15. The method of claim 13, wherein the backup data structure is a first backup data structure, the method further comprising sequentially applying a plurality of backup data structures using most recent backup data structures of the plurality of backup data structures first, the plurality of backup data structures comprising the first backup data structure as an oldest backup data structure and one or more remaining backup data structures, including:
- using the one or more remaining backup data structures to copy images of pages to the passive database without replaying required ranges of logs according to remaining log identifiers of the one or more remaining backup data structures.

16. A computer storage medium comprising instructions being executable by one or more processors to cause the one or more processors to:
- host an active database and a passive database, wherein the active database comprises a plurality of pages, wherein a page in the active database has an associated page timestamp indicating a most recent update of the page in the active database;
- replicate the active database to the passive database;
- create a backup data structure to allow for database reversion for the active database, the backup data structure being separate from the active database and the passive database and having a time value related to a creation time of the backup data structure;
- copy the page in the active database to a memory buffer separate from the active database;
- update the copy of the page in the memory buffer;
- flush the updated copy of the page in the memory buffer to the active database, wherein the flushing causes the updated copy of the page in the memory buffer to replace the page in the active database;
- prior to the flushing of the updated copy of the page in the memory buffer to the active database, store an image of the page in the active database to the backup data structure when the page in the active database, prior to the flush, is older than the time value related to the creation time of the backup data structure,
- receive a request to revert the passive database to a requested time;
- identify the backup data structure based on the requested time and the time value related to the creation time of the backup data structure; and
- revert the passive database to the requested time using the identified backup data structure to copy the image of the page to the passive database.

17. The computer storage medium of claim 16, wherein the page is a first page and the active database comprises a second page, wherein the instructions further cause the one or more processors to:
- generate transaction logs for transactions affecting the active database;
- identify log identifiers for a required range of logs that bring the active database to a consistent state as of the time value related to the creation time of the backup data structure; and
- store the identified log identifiers in the backup data structure.

18. The non-transient computer-readable storage medium of claim 17, wherein the instructions further cause the one or more processors to:
- replay the required range of logs according to the identified log identifiers onto the passive database after copying the image of the first page to the passive database to revert the passive database to the requested time.

19. The computer storage medium of claim 18, wherein the instructions further cause the one or more processors to:
- replay at least some of the transaction logs onto the passive database after replaying the required range of logs according to the identified log identifiers, wherein the at least some of the transaction logs correspond to transactions between the time value related to the creation time of the backup data structure and the requested time.

20. The computer storage medium of claim 18, wherein the backup data structure is a first backup data structure, wherein the instructions further cause the one or more processors to:
  sequentially apply a plurality of backup data structures using most recent backup data structures of the plurality of backup data structures first, the plurality of backup data structures comprising the first backup data structure as an oldest backup data structure and one or more remaining backup data structures, including using the one or more remaining backup data structures to copy images of pages to the passive database without replaying required ranges of logs according to remaining log identifiers of the one or more remaining backup data structures.

* * * * *